US008376823B2

(12) United States Patent
Moody et al.

(10) Patent No.: US 8,376,823 B2
(45) Date of Patent: Feb. 19, 2013

(54) BONUS ROUND FEATURE FOR COMMUNAL GAMING

(75) Inventors: Ernest W. Moody, Las Vegas, NV (US); Michael W. Wood, Denham Springs, LA (US); Maureen Wood, legal representative, Denham Springs, LA (US)

(73) Assignee: Ernest Moody Revocable Trust, Las Vegas, NV (US)

( * ) Notice: Subject to any disclaimer, the term of this patent is extended or adjusted under 35 U.S.C. 154(b) by 61 days.

(21) Appl. No.: 12/831,211

(22) Filed: Jul. 6, 2010

(65) Prior Publication Data

US 2011/0165925 A1 Jul. 7, 2011

Related U.S. Application Data

(60) Provisional application No. 61/223,028, filed on Jul. 4, 2009.

(51) Int. Cl.
*A63F 13/00* (2006.01)

(52) U.S. Cl. ........................................................ 463/13

(58) Field of Classification Search ..................... 463/13
See application file for complete search history.

(56) References Cited

U.S. PATENT DOCUMENTS

| | | | | |
|---|---|---|---|---|
| 5,823,873 | A | 10/1998 | Moody | |
| 6,517,074 | B1 | 2/2003 | Moody et al. | |
| 8,070,587 | B2 * | 12/2011 | Davis et al. | 463/20 |
| 2005/0101384 | A1 | 5/2005 | Parham | |

* cited by examiner

*Primary Examiner* — Peter DungBa Vo
*Assistant Examiner* — Jeffrey Wong
(74) *Attorney, Agent, or Firm* — John Edward Roethel

(57) ABSTRACT

A plurality of players participate in a primary video poker game. Anytime a player is dealt a natural Three-of-a-Kind, the player's on screen counter will be incremented by one unit. Whenever any player achieves an on screen counter that has reached three units (meaning that player has experienced three dealt Three-of-a-Kinds), then the bonus round occurs, which is three separate stud poker hands. The player who achieved the three Three-of-a-Kinds that triggered the bonus round plays all three of the bonus round hands. Any other player who has a counter of two when the bonus round is triggered, gets two of the bonus round hands, Hand One and Hand Two. Any other player who has a counter of one when the bonus round is triggered, gets one of the bonus round hands, Hand One. Any player whose counter is still at zero does not play in that bonus round.

5 Claims, 6 Drawing Sheets

BONUS ROUND FEATURE FOR COMMUNAL GAMING

CROSS-REFERENCE TO RELATED APPLICATION

This application is based on and claims the benefit of U.S. Provisional Application Ser. No. 61/223,028, filed Jul. 4, 2009, the disclosure of which is incorporated herein.

BACKGROUND OF THE INVENTION

The invention relates to a multiple player video poker game, and more particularly to a multiple player video poker game including a bonus round feature for which multiple players have the opportunity to qualify.

Conventional video draw poker is a single player game in which the player does not play against a dealer or other players, but rather merely tries to achieve the highest possible ranking poker hand.

After an initial deal of five cards, the player is allowed to discard and replace unwanted cards with replacement cards. Video poker games use poker hand rankings to determine winning combinations and a pay table is used to determine the amount awarded to the player for achieving a winning combination.

The conventional winning poker hand rankings that are used in video poker in order from highest to lowest are: Royal Flush, Straight Flush, Four of a Kind, Full House, Flush, Straight, Three of a Kind, Two Pair and a Pair of Jacks or better. Any hand having less than a Pair of Jacks or better is a losing hand. These winning poker hand rankings are used in the Jacks or Better draw poker format as well as many of the other draw poker formats.

Multiple hand video poker allows the player to play multiple hands of video poker at the same time. Typically, the player is dealt two or more starting hands with each starting hand having the same cards. The player is allowed to discard unwanted cards and replacement cards are provided for the discarded cards to form the final poker hands. The player may discard the same cards from each starting hand or the player may discard different cards from each starting hand. Each of the final poker hands are compared to a pay table to determine winning and losing hands and the player receives a payout based on the amount of his wager for each winning hand. Typical multiple hand poker games come in three, five, ten, twenty, twenty-five, fifty and one hundred hand poker formats. Multiple hand poker is described in U.S. Pat. Nos. 5,823,873 and 6,517,074, the disclosure of each is herein incorporated by this reference.

Video poker as a draw poker game using the Jacks or

Better draw poker format has been played in gaming casinos for many years. Variations of video draw poker have evolved and include video draw poker using Jokers as wild cards and video draw poker using Deuces (or even other cards, such as Sevens) as wild cards. Most of the more recent modifications to video involve the use of different draw poker formats such as Bonus Poker, Double Bonus Poker, Double-Double Bonus Poker and even Triple Bonus Poker. Different draw poker formats involve changes to the pay table and often involve using different poker hand rankings as winning hand combinations.

Many gaming casinos set up a group of video poker machines in a common location such as a game carousel so that a plurality of players can play in adjacent seating positions. Often an overhead display area is provided for these video poker machines so that information regarding the play of the video poker games can be shown to the group of players.

Communal video poker games are becoming popular. A typical communal game involves two or more video poker players playing against each either during the basic video poker game or in a bonus round played in conjunction with the primary video poker game.

For example, U.S. Published Patent Application 2005/0101384 (Parham) discloses a multiple player gaming method in which each player plays his own gaming machine and attempts to qualify for a secondary bonus game round. A first player qualifies for the secondary round by achieving a predetermined outcome on his gaming machine. Once the first player has qualified, a time period begins during which other players may also qualify for the secondary game round. Each player qualifies for the secondary game by achieving a predetermined outcome on his gaming machine.

When the time period for qualifying has closed, all qualified players then participate in the secondary bonus game round during which awards are made for achieving winning outcomes. The size of the award increases as more players qualify and each qualifying player receives an award during the secondary bonus game round. The disclosure of U.S. Published Patent Application 2005/0101384 is incorporated herein by this reference.

The present invention provides a multiple player video poker game in which each player plays a primary video poker game and may make an additional wager to earn entries into a bonus round of play which is played in a communal manner with other players who have also earned entries into the bonus round of play.

SUMMARY OF THE INVENTION

A plurality of players participate in a primary video poker game. Each player can make an additional wager at the beginning of each hand to attempt to earn entries into a bonus round.

Each player's video screen includes an on screen counter that starts at zero. Anytime a player is dealt a natural Three-of-a-Kind, the on screen counter will be incremented by one unit. Whenever any player achieves an on screen counter that has reached three units (meaning that player has experienced three dealt Three-of-a-Kinds), then the bonus round occurs.

The bonus round is three separate stud poker hands. The player who achieved the three Three-of-a-Kinds that triggered the bonus round plays all three of the bonus round hands. Any other player who has a counter of two when the bonus round is triggered, gets two of the bonus round hands, Hand One and Hand Two. Any other player who has a counter of one when the bonus round is triggered, gets one of the bonus round hands, Hand One. Any player whose counter is still at zero does not play in that bonus round.

A pool of preselected bonus round hands are used. The three bonus round hands are dealt on screen, selected at random from the pool of bonus hands. Each of Hand One, Hand Two and Hand Three may or may not have a pay multiplier displayed with it. Each final five card bonus hand will have a winning amount associated therewith based on the poker hand ranking of the final bonus hand.

DETAILED DESCRIPTION OF THE PREFERRED EMBODIMENTS

The present invention provides each player with an opportunity to play in a bonus round feature with other players. Each player earns entries into the bonus round feature by playing a primary game.

Figure 1:
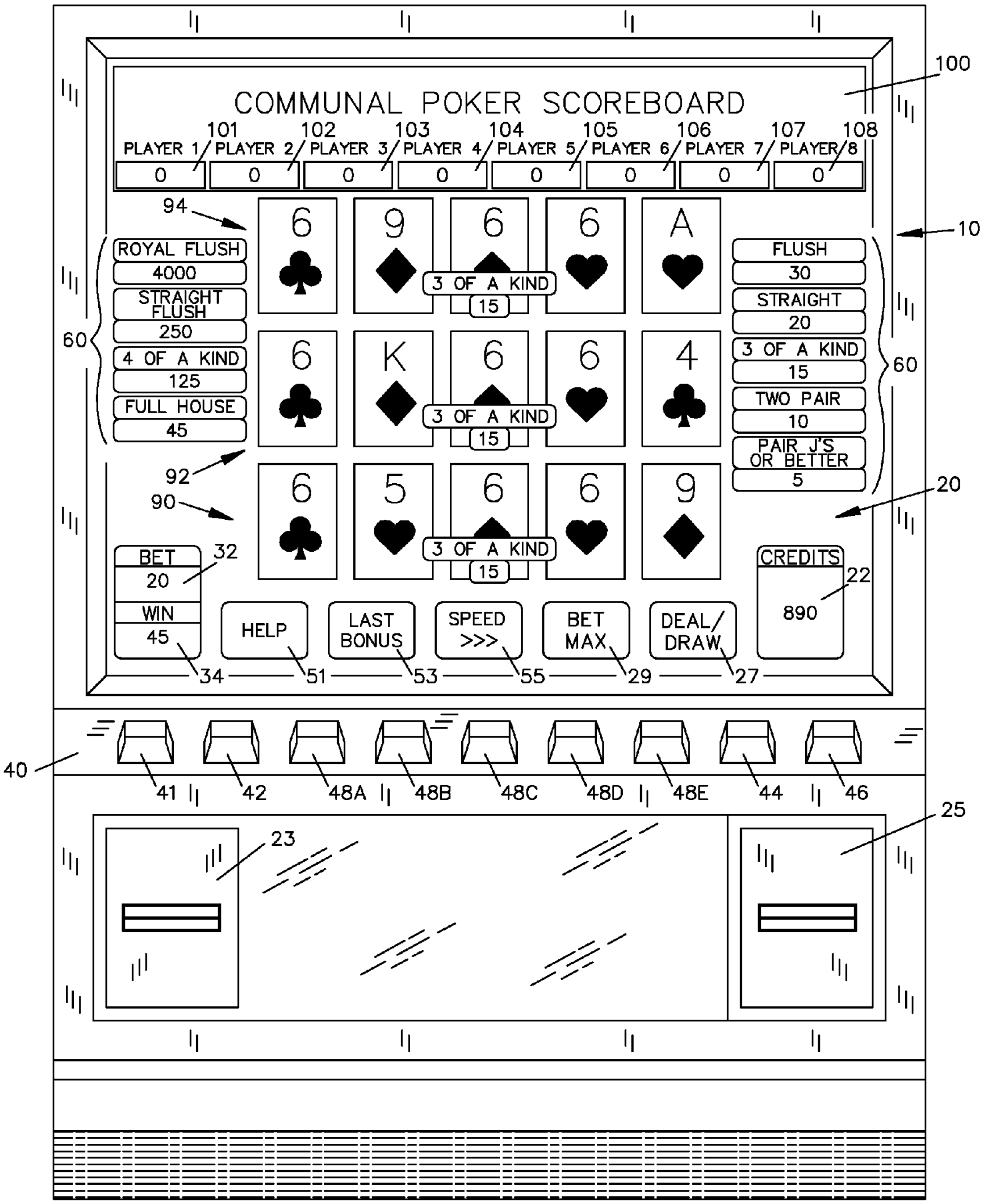
FIG. 1 shows a video poker machine configured to play the method of the present invention.
Figure 2:
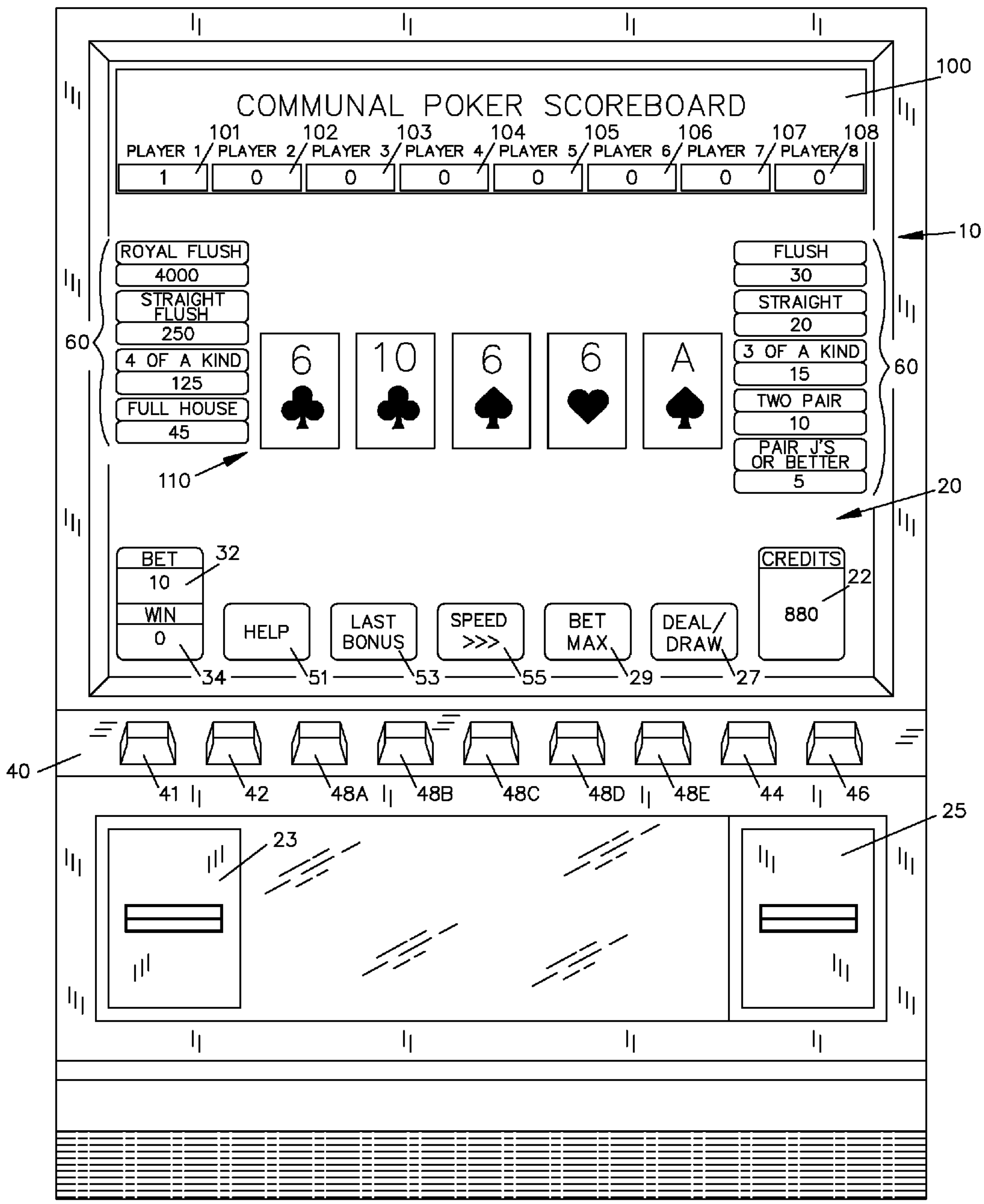
FIG. 2 shows a video screen display of the primary video poker game of the present invention.
Figure 3:
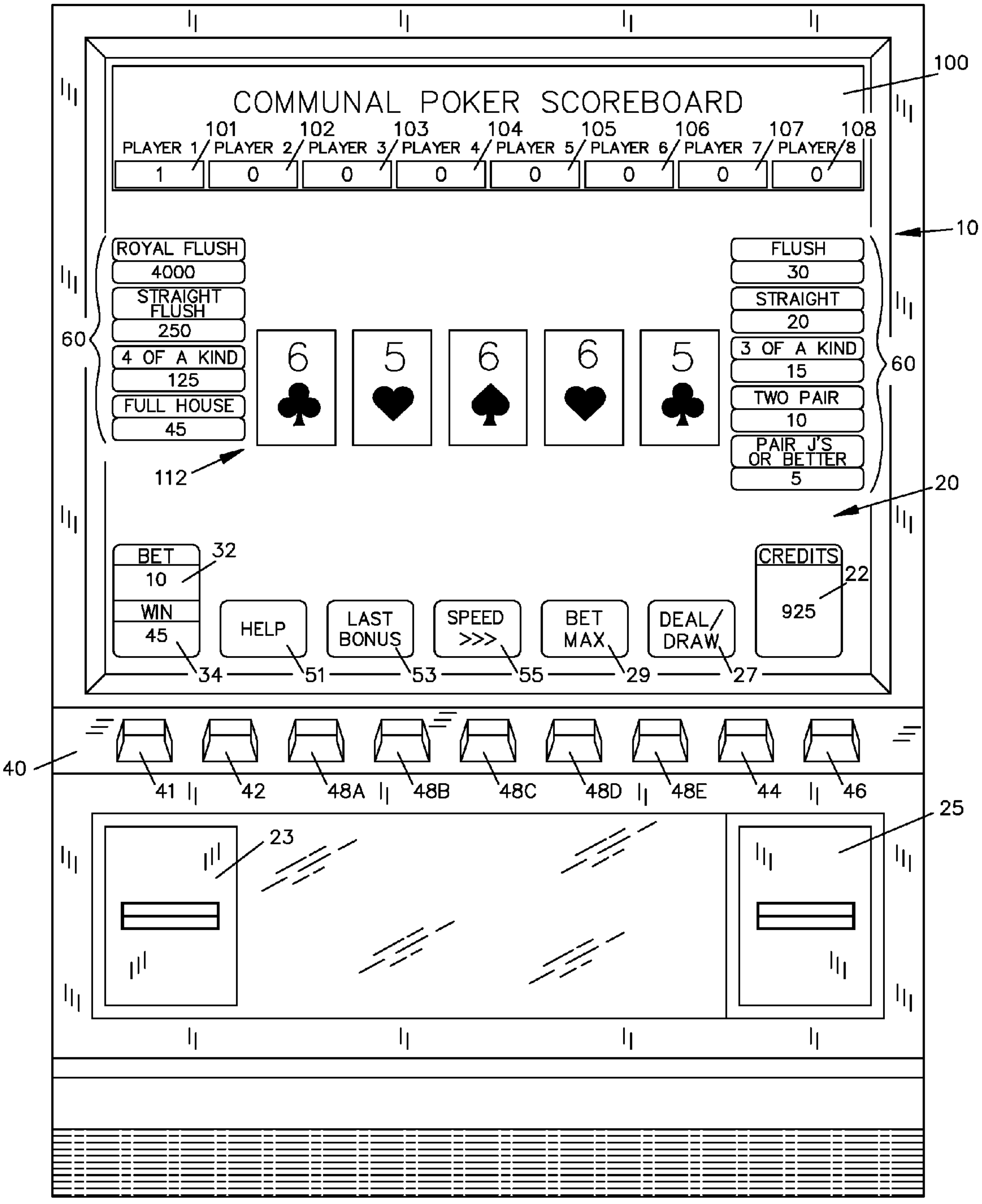
FIG. 3 shows a video screen display of the primary video poker game of the present invention.

FIG. 1 shows generally at 10 a typical video poker machine that is configured to provide to the player the method of the present invention. A portion of the poker machine 10 includes a conventional video screen display 20 upon which the play of the poker game is shown.

The poker machine 10 also includes a conventional currency/ticket acceptor 25 by which the player can insert currency or tickets to add credits to a credit meter 22. It is also possible to provide a conventional coin head (not shown) to allow the player to add credits or make wagers by using coins or gaming tokens.

As is also conventional in electronic video poker machines, the credit meter 22 is provided to show the amount of credits that the player has accrued on the gaming machine 10—either by inserting coins, tokens, currency or tickets or from winning plays achieved by the player. Whenever the player makes a wager, the amount of the wager is decremented from the credit meter 22. Whenever the player achieves a winning play during the play of the game, the amount of the winning play is incremented on the credit meter 22.

A conventional payout hopper may also be located on the interior of the gaming machine and is used to dispense coins or tokens to the player into a payout tray (not shown) when the player wishes to collect any winning amounts the player has accrued. Other suitable and conventional payout mechanisms can be used, such as a ticket printer 23 or other cashless payout devices.

A button panel 40 is also provided on the poker machine 10 and the buttons mounted on the button panel 40 are used by the player to control the operation of the poker machine 10. Any suitable configuration of the buttons on the button panel can be used and, alternatively, conventional touch screen technology can be used for any or all of the buttons mounted on the button panel.

A typical button arrangement is shown on the button panel 40 in FIG. 1. A "BET ONE" button 42 is provided to allow the player to wager one credit at a time. A "BET MAX" button 44 is provided to allow the player to wager the maximum amount of credits permitted by the configuration of the gaming machine 10. Any number of credits can be set as the maximum amount that it is possible to wager on each hand and, typically, five credits will be the maximum number of credits for any particular hand. Alternatively or additionally, a "BET ONE" location (not shown) and a "BET MAX" location can be provided on the video screen 20 to allow the player to wager by using conventional touch screen technology.

The button panel 40 may also include a "CASH OUT" button 41 by which the player can effect the cashing out of any credits accrued on the credit meter 22. A touch screen "CASH OUT" location (not shown) may also be provided.

A conventional "DEAL/DRAW" button 46 is also provided on the button panel 40 which is used by the player to activate the initial deal of the cards at the deal stage of the method of play or the dealing of replacement cards at the draw stage of the method of play as is appropriate. Similarly, a DEAL/DRAW location 27 can be provided on the video screen 20 to allow the player to effect either the deal step or the draw step by using conventional touch screen technology.

The button panel 40 is also provided with five "CARD" buttons 48A, 48B, 48C, 48D and 48E associated with each horizontal card location on the video screen display: card button 48A is associated with the left most card location, card button 48B is associated with the second from the left card location, card button 48C is associated with the middle card location, card button 48D is associated with the second from the right card location and card button 48E is associated with the right most card location. Each card button is preferably aligned below the card locations so that the player can easily associate the appropriate card button with the appropriate card location. These card locations 48 A-E are used by the player to select which cards to hold during the draw step of the poker game. Alternatively, the card locations on the video screen display 20 can be touch screen activated to allow the play to select which cards to hold by merely touching the card location on the video screen display 20.

The video screen display 20 also has a "BET" location 32 that shows the amount of credits that have been wagered on a particular round of play and a "WIN" location 34 that shows the amount of credits won by the player on a particular round of play.

Other suitable touch screen locations may be provided such as a HELP location 51 (which allows the player to access a Help screen which contains game play information and other text helpful to the player), a LAST BONUS location 53, and a SPEED location 55 (that allows the player to increase or decrease the speed at which cards are displayed on the screen 20).

The screen 20 also provides room to show the pay table 60 and the draw poker hand or hands used in the primary game. For example, as shown in FIG. 1, the primary draw poker game uses a Jacks or Better pay table 60 and a three hand multiple hand primary game is being played. At the conclusion of the primary three hand game, the player achieved a final hand of Three-of-a-Kind of each of Hand One 90, Hand Two 92, and Hand Three 94. The player had a win forty-five credits shown in the Win location 34.

The primary game of draw poker can be single hand poker or multiple hand poker and may use a standard deck of fifty-two playing cards or a deck of playing cards that includes one of more Jokers.

The screen 20 also includes a location 100 which displays the Communal Poker Scoreboard. This is the location at which the counters 101-108 are provided to keep track of the Three-of-a-Kinds that are achieved by each player.

The method of the present invention will now be described. In the example of play shown in FIGS. 2-6, each player is playing single hand poker as the primary game.

The method comprises playing a video poker game in which multiple players, such as two or more players, participate. Each player plays independently a video poker gaming machine configured to play a primary game and each player is attempting to qualify for a bonus game. Each player is provided with a video poker gaming machine upon which the player can play the primary video poker game.

Whenever a player achieves a predetermined result during the play of the primary video poker game, the player earns a count toward qualifying for the bonus game. Each player continues to play his primary video poker game until at least one player has earned a preestablished number of counts, at which point the bonus game starts.

When the bonus game starts, any player who has earned the preestablished number of counts plays all of the bonus game and any player who has earned less than the preestablished number of counts plays less than all of the bonus game.

The primary game can be a single hand video poker game or a multiple hand video poker game. The bonus game can be a multiple hand stud poker game, which can use predetermined stud poker hands.

Each video poker machine is interconnected with the other video poker machines so that the results of the play of each video poker machine can be tracked.

Each player makes a wager to play each hand of the primary video poker game. Each player can make an additional wager at the beginning of each hand to attempt to earn entries into a bonus round. In the example shown in FIG. 2, a player has made a ten credit wager as shown in BET location 32—five credits for the primary video poker game and five credits to participate in the bonus round feature.

Alternatively, the method can be performed without wagering, rather as an amusement game in which each player is awarded points instead of money. In the amusement game version, the credits do not have monetary value.

The player presses the DEAL button 46 or the DEAL screen location 27 and an initial five card hand 110 is displayed. In the example shown in FIG. 2, the player's initial hand 110 is a Six of Clubs, a Ten of Clubs, a Six of Spades, a Six of Hearts, and a Ace of Spades. The player's initial hand 110 has a poker hand ranking of Three-of-a-Kind.

Each player's video screen includes an on screen counter that starts at zero. Anytime a player is dealt a qualifying hand, such as a natural Three-of-a-Kind, the player earns a count toward qualifying for the bonus game and the on screen counter will be incremented by one unit. Because Player 1 has been dealt a Three-of-a-Kind as his initial hand 110, Player 1's on screen counter 101 increments to 1.

Any suitable qualifying hand made be used depending on the video poker game format being played in the primary game.

Player 1 completes the play of his initial video poker hand of his primary game by discarding and drawing replacement cards according to the conventional manner of play of video poker. As shown in the example in FIG. 3, the player has discarded the Ten of Clubs and the Ace of Spades. Replacement cards (the Five of Hearts and the Five of Clubs) are displayed into the hand and Player 1 achieves a final five card hand 112 that results in a poker hand ranking of a Full House. Based on the player's five credit wager and the payout shown in the pay table 60 for a Full House, the player is awarded forty-five credits which is displayed in the WIN location 34.

Player 1 and the other players continue the play of the primary video poker game. As each player achieves a dealt Three-of-a-Kind as his initial hand, that player counter increments one unit as shown in the Communal Poker Scoreboard 100.

Figure 4:
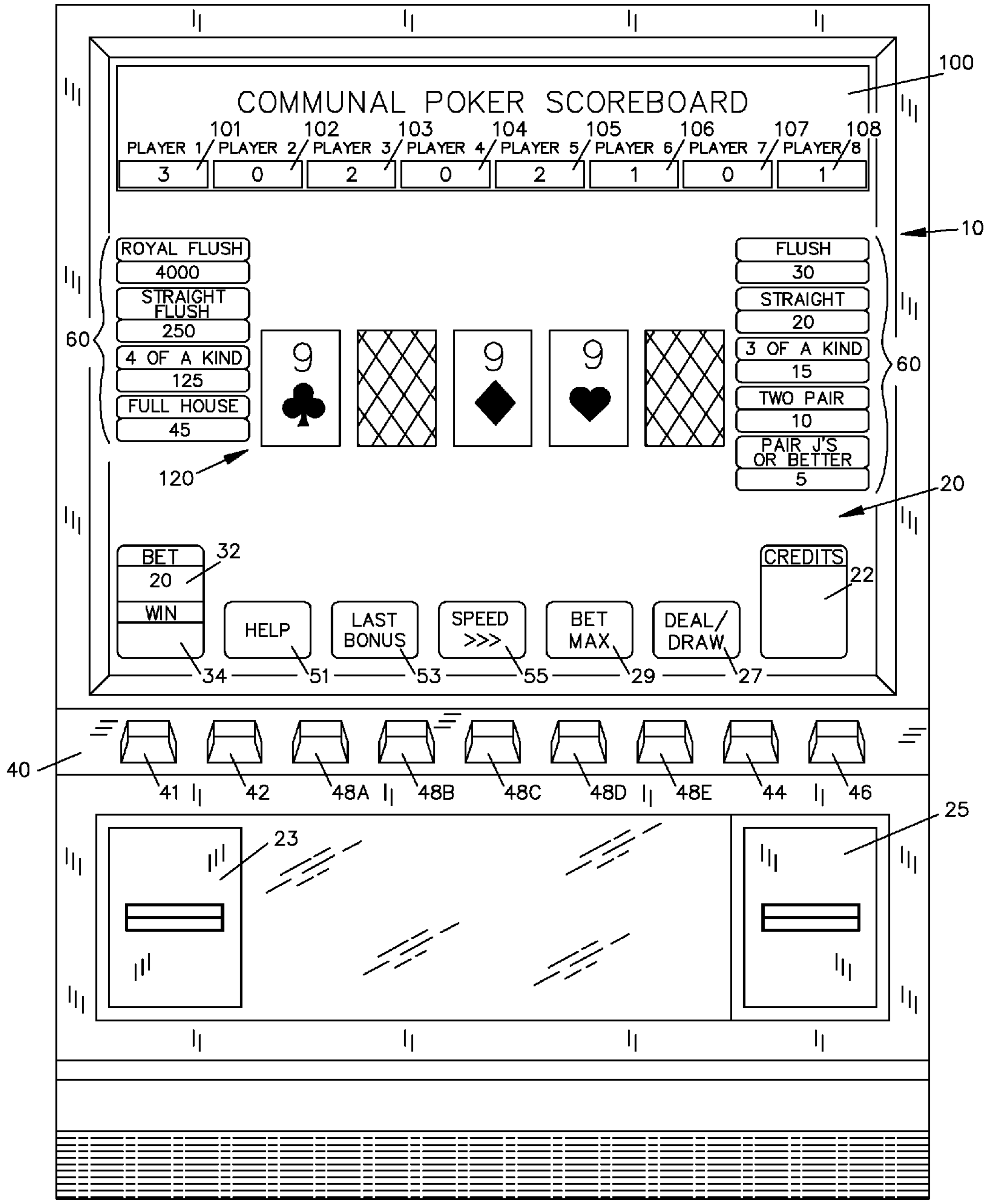
FIG. 4 shows a video screen display of the primary video poker game of the present invention.

Eventually, one player will achieve three units in his on screen counter. Whenever any player achieves an on screen counter that has reached three units (meaning that player has experienced three dealt Three-of-a-Kinds), then the bonus round occurs. For example, as shown in FIG. 4, player 1 has an initial hand 120 of Three Nines. His on screen counter 101 increments to three units which triggers the bonus round.

After each player has completed the play of his current hand in the primary poker game, the bonus round starts. Each player whose on screen counter has either one, two, or three units participates in the bonus round.

In a preferred embodiment, the bonus round is three separate stud poker hands. The player who achieved the three Three-of-a-Kinds that triggered the bonus round plays all three of the bonus round hands. Any other player who has a counter of two when the bonus round is triggered, gets to play two of the bonus round hands, Hand One and Hand Two. Any other player who has a counter of one when the bonus round is triggered, gets to play one of the bonus round hands, Hand One. Any player whose counter is still at zero does not play in that bonus round.

In a preferred embodiment, a pool of preselected hand are used for the bonus round. For example, nine hands can be used during the bonus round with three of these bonus rounds hands used each time the bonus round is triggered.

Figure 5:
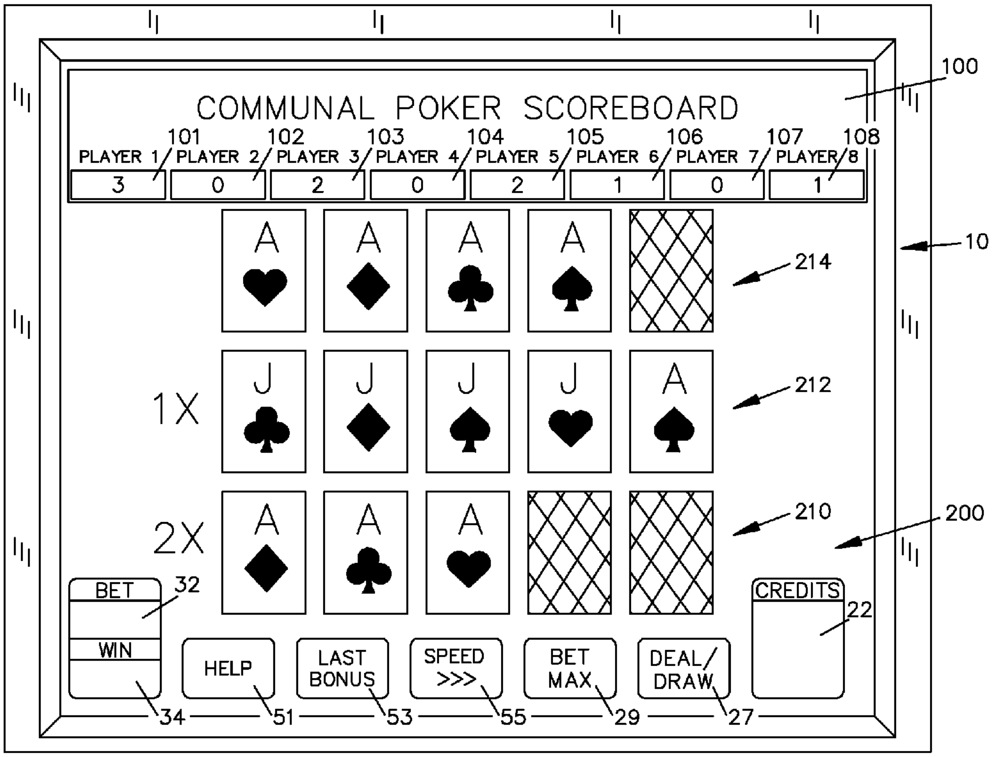
FIG. 5 shows a video screen display of the Bonus Round feature of the present invention.
Figure 6:
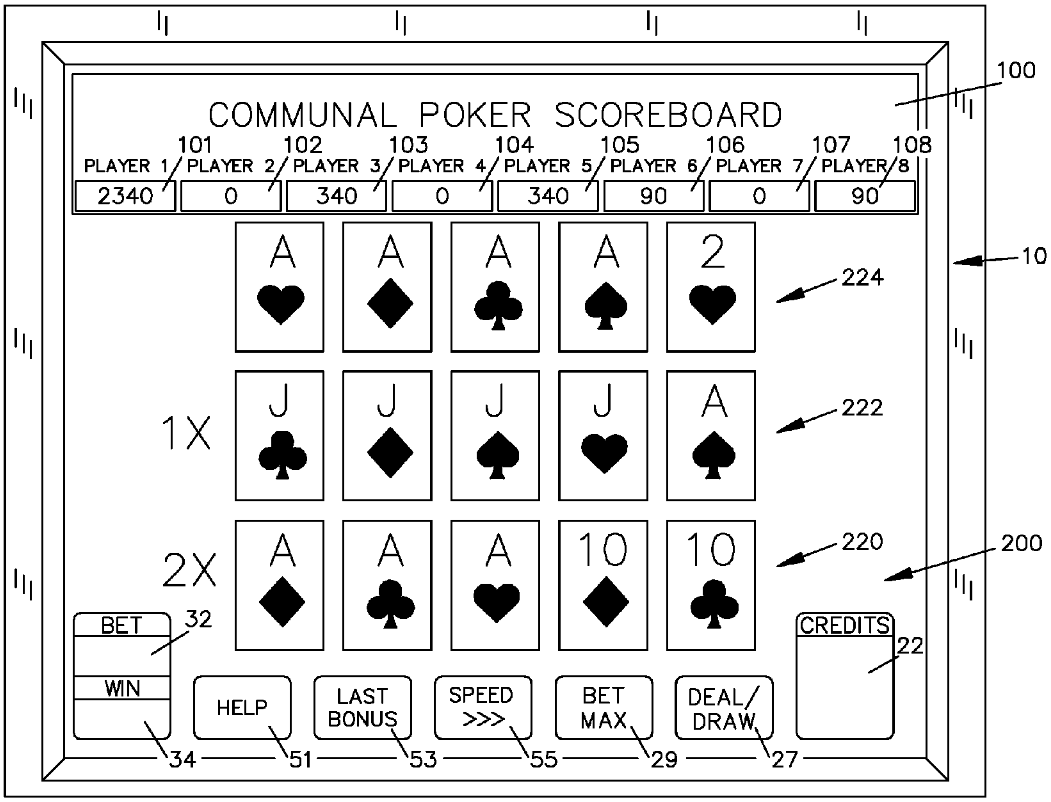
FIG. 6 shows the Bonus Round feature of the present invention.

FIG. 5 shows an example of the bonus round. As shown in the Communal Poker Scoreboard, Player 1 has three units 101 which has triggered the start of the bonus round. Player 3 has two units 103 and Player 5 has two units 105, Player 6 has one unit 106 and Player 8 has one unit 108. Player 2 has zero units 102, Player 4 has zero units 104 and Player 7 has zero units 107 which means that these three players do not participate in the bonus round and will not win any bound round awards.

The three bonus round hands are dealt on screen, selected at random from the pool of bonus hands. Each of Hand One, Hand Two and Hand Three may or may not have a pay multiplier displayed with it. Each final five card bonus hand will have a winning amount associated therewith based on the poker hand ranking of the final bonus hand.

Again as shown in FIG. 5 as an example of the bonus round, Hand One 210 is displayed with Three Aces and two face down cards and also is displayed with a 2× multiplier. Hand Two 212 is displayed with Four Jacks and an Ace and is also displayed with a 1× multiplier. Hand Three 214 is displayed with Four Aces and a face down card.

The bonus round is completed by revealing the face down cards in each hand. The face down cards in Hand One 220 are a Ten of Diamonds and a Ten of Clubs. This gives Hand One 220 a poker hand ranking of a Full House and, with the 2× multiplier, results in an award of ninety credits for Hand One 220. Player 6, having one unit, receives the award of ninety credits as shown at 106 and Player 8, having one unit, receives the award of ninety credits as shown at 108.

Hand Two 222 has no face down cards and Hand Two 222 has a poker hand ranking of Four-of-a-Kind which, with the 1× multiplier, results in an award of two hundred fifty credits. Player 3, having two units, receives the award for Hand One and for Hand Two which totals 340 credits as shown at 103. Player 5, having two units, receives the award for Hand One and for Hand Two which totals 340 credits as shown at 105.

The face down card of Hand Three 224 is revealed as a Two of Hearts which results in a poker hand ranking of Four Aces with a kicker and an award of two thousand credits. Player 1, having three units, receives the award for Hand One and for Hand Two and for Hand Three which totals 2340 credits as shown at 101. Any hand that does not have a multiplier associated therewith is paid or awarded the same as a hand with a 1× multiplier.

Any number of players can participate in the bonus round feature of the present invention. In the example discussed above, eight players were shown participating, but the numbers of players may be more or less than eight.

The primary game used to establish entries for the bonus round may be single hand or multiple hand video poker with some players playing single hand poker while other players are playing multiple hand poker. The typical additional wager required during the primary game would be five credits, although more or less than five credits could be used as the additional wager.

The preselected bonus round hands can be any stud poker hands that provide a payout to the participating players, and could include hands that start at one payout level, but could improve to a higher payout level as the face down cards are revealed.

Examples of preselected bonus round hands and its associated award include (where FD means a Face Down card):

K♠ Q♠ J♠ 10♠ FD 4000 if FD is A♠
 250 if FD is 9♠
 30 if FD is any other ♠
 20 if FD card is non♠ A/9
 5 if FD is non♠ K/Q/J
 0 if FD any other card Q♦ J♦ 10♦ 9♦ FD 250 if FD is a K♦/8♦
 30 if FD is any other ♦
 20 if FD is non♦ K/8
 5 if FD is non♦ Q/J
 0 if FD any other card 2♦ 2♠ 2♣ A♥ FD 800 if FD card is a 2♥
 45 if FD card is another A
 15 if FD card is any other card K♣ K♦ K♠ FD FD 250 if either FD card is K♥
 45 if both FD are a pair
 15 if FD are any other cards A♥ K♥ Q♥ 10♥ FD 4000 if FD is J♥
 30 if FD is any other ♥
 20 if FD is non♥ J
 5 if FD is non♥ A/K/Q
 0 if FD any other card A♥ A♦ A♣ A♠ FD 2000 if FD is 2/3/4
 800 if FD any other card 2♥ 2♦ 2♣ 2♠ FD 800 if FD is A
 400 if FD any other card A♥ A♣ A♦ FD FD 2000 if FD is A♠ and FD is 2/3/4
 2000 if FD is A♠ and FD is not 2/3/4
 45 if both FD are a pair
 15 if FD are any other cards Any other bonus hands may be used.

Multipliers may also be applied on a random basis to any of the bonus hands.

Other variations can be applied. For example, instead of or in addition to getting to qualify for more bonus hands by getting more Three-of-a-Kinds, a player would get an increased multiplier on one or more of the bonus hands. Also, all players who qualify for the bonus hands would get to play all three bonus hands. A player who has qualified by making two Three-of-a-Kinds would get a 2× multiplier on one or more of the bonus rounds while a player who has qualified by making three Three-of-a-Kinds would get a 4× multiplier.

While the invention has been illustrated with respect to several specific embodiments thereof, these embodiments should be considered as illustrative rather than limiting.

What is claimed is:

1. A method of playing a video poker game in which a plurality players participate, each player of said plurality of players playing independently a video poker gaming machine configured to play a primary game and each player of said plurality of players attempting to qualify for a bonus poker game, the method comprising:

a) providing each player of said plurality of players with a video poker gaming machine upon which the player can play a primary video poker game through a video screen display;

b) whenever each player of said plurality of players achieves a predetermined result during the play of the primary video poker game, said player earns a count toward qualifying for the bonus poker game, wherein said count is displayed on the video screen display, wherein said predetermined result comprises a suitable qualifying hand for said video poker game;

c) each player of said plurality of players continues to play said player's respective primary video poker game, through a button panel or touch screen, until at least one player of said plurality of players has earned a preestablished number of counts, the preestablished number of counts being at least two, at which point the bonus poker game starts;

d) when the bonus game starts on the video poker gaming machine, each player of said plurality of players who has earned the preestablished number of counts plays all of the bonus poker game and each player of said plurality of players who has earned less than the preestablished number of counts plays less than all of the bonus poker game.

2. The method of claim 1 in which the primary game is a single hand video poker game.

3. The method of claim 1 in which the primary game is a multiple hand video poker game.

4. The method of claim 1 in which the bonus game is a multiple hand stud poker game.

5. The method of claim 4 in which the multiple hand stud poker game uses predetermined stud poker hands.

* * * * *